United States Patent
Baird

(10) Patent No.: US 10,131,419 B2
(45) Date of Patent: Nov. 20, 2018

(54) SYSTEMS AND METHODS FOR DETECTING LANDING GEAR GROUND LOADS

(75) Inventor: Bradley W. Baird, Grimsby (CA)

(73) Assignee: Goodrich Corporation, Charlotte, NC (US)

(*) Notice: Subject to any disclaimer, the term of this patent is extended or adjusted under 35 U.S.C. 154(b) by 1204 days.

(21) Appl. No.: 13/267,561

(22) Filed: Oct. 6, 2011

(65) Prior Publication Data

US 2012/0095702 A1    Apr. 19, 2012

Related U.S. Application Data

(60) Provisional application No. 61/393,456, filed on Oct. 15, 2010, provisional application No. 61/455,170, (Continued)

(51) Int. Cl.
*B64C 25/00* (2006.01)
*G07C 5/08* (2006.01)
(Continued)

(52) U.S. Cl.
CPC .......... *B64C 25/00* (2013.01); *B64D 45/0005* (2013.01); *G07C 5/08* (2013.01); (Continued)

(58) Field of Classification Search
CPC ................ B64C 25/00; B64D 45/0005; B64D 2045/008
(Continued)

(56) References Cited

U.S. PATENT DOCUMENTS

| 1,884,023 A | 2/1932 | Terry |
| 2,295,830 A | 9/1942 | Carlson |

(Continued)

FOREIGN PATENT DOCUMENTS

| CN | 1267362 | 9/2000 |
| DE | 3239877 A1 | 5/1984 |

(Continued)

OTHER PUBLICATIONS

Bradley, W. Baird, Overload Detection/Health Monitoring Landing Gear Sensor System Proposal, Jan. 1, 2008, Ryerson University.*
(Continued)

*Primary Examiner* — John Breene
*Assistant Examiner* — Peter Ngo
(74) *Attorney, Agent, or Firm* — Snell & Wilmer L.L.P.

(57) ABSTRACT

There is provided a system for predicting loading of a landing gear including, a plurality sensors positioned proximate to the landing gear. The plurality of sensors measure strain applied to the landing gear, and each sensor yielding strain data. The system further includes a processor that receives the strain data from the plurality of sensors and predicts at least one ground load based on strain data. There is further provided a method for predicting loading of a landing gear. The method includes powering a plurality of sensors located proximate to a landing gear structure, interrogating the plurality of sensors via data acquisition circuitry to yield strain data, instructing the data acquisition circuitry as to a sampling rate and data resolution to be used for the interrogating, and, finally, processing the strain data to predict a ground load.

18 Claims, 13 Drawing Sheets

Related U.S. Application Data filed on Oct. 15, 2010, provisional application No. 61/455,169, filed on Oct. 15, 2010.

(51) Int. Cl.
    *B64D 45/00*     (2006.01)
    *G05B 23/02*     (2006.01)
    *G07C 5/00*     (2006.01)

(52) U.S. Cl.
    CPC .... *B64D 2045/008* (2013.01); *G05B 23/0221* (2013.01); *G07C 5/008* (2013.01); *Y02T 50/53* (2013.01)

(58) Field of Classification Search
    USPC .......................................................... 702/42
    See application file for complete search history.

(56) References Cited

U.S. PATENT DOCUMENTS

| | | | |
|---|---|---|---|
| 2,968,031 A | 1/1961 | Higa | |
| 3,109,984 A | 11/1963 | Mehr | |
| 3,280,628 A | 10/1966 | Schloss | |
| 3,433,064 A | 3/1969 | Jacobson | |
| 3,471,758 A | 10/1969 | Werner | |
| 3,577,883 A | 5/1971 | Werner | |
| 3,584,503 A * | 6/1971 | Senour ........................ | 73/65.06 |
| 3,729,985 A | 5/1973 | Sikorra | |
| 3,783,496 A | 1/1974 | Siler | |
| 3,995,696 A | 12/1976 | Kainer et al. | |
| 4,114,428 A | 9/1978 | Popenoe | |
| RE30,183 E | 1/1980 | Popenoe | |
| 4,197,753 A | 4/1980 | Harting et al. | |
| 4,269,070 A | 5/1981 | Nelson et al. | |
| 4,312,042 A | 1/1982 | Bateman | |
| 4,384,496 A | 5/1983 | Gladwin | |
| 4,386,386 A | 6/1983 | Jackson et al. | |
| 4,422,341 A | 12/1983 | Espiritu Santo et al. | |
| 4,445,386 A | 5/1984 | Nielson | |
| 4,480,480 A | 11/1984 | Scott et al. | |
| 4,510,814 A | 4/1985 | Espiritu Santo et al. | |
| 4,651,402 A | 3/1987 | Bonfils | |
| 4,850,552 A | 7/1989 | Darden et al. | |
| 4,925,249 A | 5/1990 | Auspelmyer | |
| 4,944,181 A | 7/1990 | Wnuk | |
| 5,010,775 A | 4/1991 | Choisnet | |
| 5,086,651 A | 2/1992 | Westermo et al. | |
| 5,205,514 A | 4/1993 | Patzig et al. | |
| 5,289,435 A | 2/1994 | Milner et al. | |
| 5,314,115 A | 5/1994 | Moucessian | |
| 5,358,637 A | 10/1994 | Hutzler et al. | |
| 5,388,463 A | 2/1995 | Scott | |
| 5,392,654 A | 2/1995 | Boyle | |
| 5,446,666 A | 8/1995 | Bauer | |
| 5,477,740 A | 12/1995 | Shioya et al. | |
| 5,518,206 A | 5/1996 | Arnold et al. | |
| 5,815,091 A | 9/1998 | Dames et al. | |
| 6,070,662 A | 6/2000 | Ciglenec et al. | |
| 6,204,771 B1 | 3/2001 | Ceney | |
| 6,279,407 B1 | 8/2001 | Park et al. | |
| 6,289,289 B1 | 9/2001 | Zweifel | |
| 6,334,588 B1 | 1/2002 | Porte | |
| 6,349,901 B1 | 2/2002 | Grossman | |
| 6,354,152 B1 | 3/2002 | Herlik | |
| 6,516,508 B1 | 2/2003 | Gandarillas | |
| 6,536,292 B1 | 3/2003 | Richards et al. | |
| 6,581,481 B1 | 6/2003 | Perusek | |
| 6,676,075 B2 * | 1/2004 | Cowan et al. ............ | 244/100 R |
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,959,497 B2 | 11/2005 | Leidinger | |
| 7,208,945 B2 | 4/2007 | Jones et al. | |
| 7,558,687 B1 * | 7/2009 | Bode ...................... | G05B 21/02 700/14 |
| 7,589,645 B2 | 9/2009 | Schmidt | |
| 7,680,630 B2 | 3/2010 | Schmidt | |
| 7,747,396 B2 | 6/2010 | El-Bakry et al. | |
| 7,747,415 B1 | 6/2010 | Churchill et al. | |
| 7,843,363 B2 | 11/2010 | Grichener et al. | |
| 8,011,255 B2 | 9/2011 | Arms et al. | |
| 8,301,914 B2 | 10/2012 | Gelonese | |
| 8,359,932 B2 | 1/2013 | Ericksen et al. | |
| 2002/0043112 A1 | 4/2002 | Schwarz et al. | |
| 2002/0199131 A1 | 12/2002 | Kocin | |
| 2003/0042354 A1 | 3/2003 | Cowan et al. | |
| 2003/0069670 A1 | 4/2003 | Osinga | |
| 2003/0071165 A1 | 4/2003 | Fiebick et al. | |
| 2003/0152145 A1 | 8/2003 | Kawakita | |
| 2003/0172740 A1 | 9/2003 | Stevenson et al. | |
| 2003/0191564 A1 * | 10/2003 | Haugse et al. ................ | 701/29 |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0150529 A1 | 8/2004 | Benoit et al. | |
| 2004/0187607 A1 | 9/2004 | Kilmartin | |
| 2004/0225474 A1 | 11/2004 | Goldfine et al. | |
| 2005/0030010 A1 | 2/2005 | Jones et al. | |
| 2005/0162389 A1 | 7/2005 | Obermeyer et al. | |
| 2006/0004499 A1 | 1/2006 | Trego et al. | |
| 2006/0038410 A1 | 2/2006 | Pratt et al. | |
| 2006/0144997 A1 * | 7/2006 | Schmidt et al. ......... | 244/100 R |
| 2006/0187017 A1 | 8/2006 | Kulesz et al. | |
| 2007/0006662 A1 | 1/2007 | Giazotto | |
| 2007/0228825 A1 | 10/2007 | Jacques | |
| 2008/0036617 A1 | 2/2008 | Arms et al. | |
| 2008/0114506 A1 | 5/2008 | Davis et al. | |
| 2008/0119967 A1 * | 5/2008 | Long et al. ...................... | 701/3 |
| 2008/0196945 A1 | 8/2008 | Konstas | |
| 2008/0282817 A1 | 11/2008 | Breed | |
| 2009/0132129 A1 | 5/2009 | Breed | |
| 2009/0173823 A1 | 7/2009 | Shetzer | |
| 2009/0179751 A1 | 7/2009 | Forster | |
| 2009/0183561 A1 | 7/2009 | Gregory et al. | |
| 2009/0216398 A1 | 8/2009 | Lynch et al. | |
| 2009/0265120 A1 * | 10/2009 | O'Brien ........................ | 702/42 |
| 2009/0293642 A1 | 12/2009 | Schmitz | |
| 2010/0026482 A1 | 2/2010 | Grichener et al. | |
| 2010/0063777 A1 | 3/2010 | Berkcan et al. | |
| 2010/0090822 A1 | 4/2010 | Benson et al. | |
| 2010/0141377 A1 | 6/2010 | Andarawis et al. | |
| 2010/0162864 A1 | 7/2010 | Kozasa et al. | |
| 2010/0288878 A1 | 11/2010 | Bennett | |
| 2010/0315219 A1 * | 12/2010 | Gowan et al. ................ | 340/441 |
| 2011/0018741 A1 | 1/2011 | Grichener et al. | |
| 2011/0026163 A1 | 2/2011 | Komori et al. | |
| 2011/0035054 A1 | 2/2011 | Gal et al. | |
| 2011/0044145 A1 * | 2/2011 | Lin ...................... | G11B 7/0053 369/47.51 |
| 2011/0285527 A1 * | 11/2011 | Arms .................... | B64C 27/006 340/539.1 |
| 2012/0011946 A1 | 1/2012 | Eriksen et al. | |
| 2012/0012700 A1 | 1/2012 | Eriksen et al. | |
| 2012/0012701 A1 | 1/2012 | Eriksen et al. | |
| 2012/0043417 A1 | 2/2012 | Eriksen et al. | |
| 2012/0046799 A1 | 2/2012 | Alex et al. | |
| 2012/0053784 A1 | 3/2012 | Schmidt et al. | |
| 2012/0095702 A1 | 4/2012 | Baird | |
| 2012/0095703 A1 | 4/2012 | Zakrzewski et al. | |
| 2012/0101770 A1 | 4/2012 | Grabiner et al. | |
| 2012/0306377 A1 | 4/2012 | Igaki et al. | |
| 2012/0121504 A1 | 5/2012 | Rader et al. | |
| 2013/0135994 A1 | 5/2013 | Michel et al. | |
| 2013/0154829 A1 | 6/2013 | Mostov | |

FOREIGN PATENT DOCUMENTS

| | | |
|---|---|---|
| DE | 3619233 | 12/1986 |
| DE | 4035197 A1 | 1/1992 |
| EP | 0072634 A1 | 2/1983 |
| EP | 1839984 A1 | 10/2007 |

(56) References Cited

FOREIGN PATENT DOCUMENTS

| | | |
|---|---|---|
| EP | 2420447 | 2/2012 |
| EP | 2441671 | 4/2012 |
| FR | 2365785 | 4/1978 |
| FR | 2545170 | 11/1984 |
| GB | 643615 | 9/1950 |
| GB | 2226416 A | 6/1990 |
| GB | 2387912 | 10/2003 |
| SU | 1469339 A1 | 3/1989 |
| WO | WO-2002012043 A1 | 2/2002 |
| WO | WO-2004013785 A2 | 2/2004 |
| WO | 2006053433 | 5/2006 |
| WO | WO-2006067442 A1 | 6/2006 |
| WO | 2007149256 | 12/2007 |
| WO | 2009009732 | 1/2009 |
| WO | 2010031179 | 3/2010 |
| WO | 2012051578 | 4/2012 |

OTHER PUBLICATIONS

Extended Search Report dated Feb. 8, 2012 in connection with EP Application No. 11250852.8.
Extended Search Report dated Feb. 4, 2010 in connection with European Patent Application No. 05808070.6.
Office Action dated Feb. 3, 2012 in connection with U.S. Appl. No. 13/271,468.
Partial Search Report dated Nov. 2, 2011 in connection with European Patent Application No. 11250645.6.
Office Action dated Mar. 19, 2012 in connection with U.S. Appl. No. 12/839,401.
Extended Search Report dated Mar. 15, 2012 in connection with European Patent Application No. 11250645.6.
Partial Search Report dated Nov. 2, 2011 in connection with European Patent Application No. 11250647.2.
Extended Search Report dated Mar. 15, 2012 in connection with European Patent Application No. 11250647.2.
First Action Pre-Interview Communication dated May 30, 2012 in connection with U.S. Appl. No. 12/839,216.
Pepper+Fuchs, Mounting Accessories, Aug 7, 2008, pp. 1-4.
International Preliminary Report on Patentability issued by the Canadian Intellectual Property Office dated May 22, 2007 for Corresponding International App. No. PCT/CA2005/001750 filed Nov. 18, 2005.
Free Dictionary definition of "pin" http://www.thefreedictionary.com/PIN.
Exam Report for EP Patent App. No. 05808070.6 dated Nov. 1, 2013
Exam Report for EP Patent App. No. 05808070.6 dated Mar. 5, 2014.
Exam Report for EP Patent App. No. 05808070.6 dated Aug. 26, 2014.
Exam Report for EP Patent App. No. 11250852.8 dated Aug. 14, 2013.
Extended Search Report for EP Patent App. No. 11250653.0 dated Apr. 11, 2014.
USPTO; All Office Actions (Non-Final, Final, Advisory Actions, Restrictions/Elections, etc.), Notices of Allowance, 892s, 1449s and SB/08As from U.S. Appl. Nos. 13/271,468, 13/274,098, 13/272,317, 13/273,999, 13/957,368, 12/839,216, 12/839,061 and 12/839,401.
Extended Search Report dated Dec. 9, 2014 in European Application No. 14170817.2.
Extended Search Report dated Jan. 26, 2015 in European Application No. 11250850.2.
Extended Search Report dated Jan. 26, 2015 in European Application No. 11250729.8.
Office Action dated Feb. 17, 2015 in Chinese Application No. 201110236000.8.
Intention to Grant dated Jul. 22, 2015 in European Application No. 11250653.0.
Communication Pursuant to Article 94(3) EPC dated Dec. 10, 2015 in European Application No. 11250647.2.
Communication Pursuant to Article 94(3) EPC dated Dec. 10, 2015 in European Application No. 11250645.6.
USPTO; All Office Actions (Non-Final, Final, Advisory Actions, Restrictions/Elections, etc.), Notices of Allowance, 892s, 1449s and SB/08As from U.S. Appl. No. 12/857,793.
Extended European Search Report dated Jan. 21, 2016 in European Application No. 11250849.4.
Office Action dated Mar. 8, 2016 in Chinese Application No. 201110236000.8.
Communication under Rule 71(3) EPC dated Jun. 20, 2016 in European Application No. 11250729.9.
Communication under Rule 71(3) EPC dated Jun. 27, 2016 in European Application No. 11250850.2.
Notification to Grant Patent Right for Invention dated Aug. 10, 2016 in Chinese Application No. 201110236000.8.

* cited by examiner

SYSTEMS AND METHODS FOR DETECTING LANDING GEAR GROUND LOADS

CROSS-REFERENCE TO RELATED APPLICATIONS

This application claims benefit of priority from U.S. Provisional Application Ser. No. 61/455,169, filed Oct. 15, 2010, U.S. Provisional Application Ser. No. 61/455,170, filed Oct. 15, 2010, and U.S. Provisional Application Ser. No. 61/393,456, filed Oct. 15, 2010, the contents of which are incorporated by reference herein in their entirety.

BACKGROUND OF THE INVENTION

1. Field of the Invention

The present invention relates to landing gear structures in aircraft, and more particularly, to systems and methods for determining, e.g., predicting, ground loads applied thereto.

2. Description of the Related Art

Airframe manufacturers typically require that landing gear suppliers provide a detection system to determine if any overload condition occurs. Overload conditions refer to any combination of forces, e.g., stresses, strains and ground loads, which act on the landing gear that cause one or more components to reach design limits and, ultimately, yield. Typically, overload conditions occur during landing, ground maneuvers or towing operations.

Historically detection of overload conditions was limited to pilot opinion and reporting. However, more recent attempts that detect overload conditions use recorded flight data to assess a severity of a landing event which, in turn, is predicts whether an overload condition may have occurred. For example, U.S. Pat. No. 7,589,645 to Schmidt (hereinafter "Schmidt") discloses an overload detection system that uses accelerometer measurements in combination with flight data from the avionics system to determine if a hard landing occurs. Occurrence of this hard landing can result in an overload condition. However, the approach disclosed in Schmidt proves highly inaccurate since it is predicated on only accelerometer measurements and flight and fails to provide quantitative information of actual loads experienced by the landing gear. In addition, accelerometer measurements and flight data are only available when accelerometers and avionic electronics are operational, e.g., power is on. Accordingly, Schmidt fails to detect if an overload occurs during towing operations whereby aircraft power is off. Further still, Schmidt failure to provide quantitative information of actual loads experienced by the landing gear results in an overwhelming number of erroneously detected overload conditions. Erroneous detection of overload conditions causes an increased cost of maintenance for the landing gear and, ultimately, a delay in future deployment for the aircraft due to required verification inspections that clear the landing gear prior to further flights. The required verification inspections are expensive, time-consuming and complex.

For example, if there are indications of overload conditions after initial visual ground inspections, subsequent inspections on the landing gear are performed during landing gear operation and while the aircraft is placed in suspension, e.g., on aircraft jacks. Thereafter, if these subsequent inspections indicate overload conditions, the entire landing gear is removed and sent to a qualified facility for detailed Non-Destructive Testing (NDT). At present, the entire landing gear is removed, even if only a single landing gear component fails, since, it is not possible to determine individual landing gear component loads and, thus, it is not possible to determine when individual landing gear components reach design limits and fail.

Therefore, there is a need for accurate detection of overload conditions, so as to eliminate unnecessary inspections. Moreover, there is a need for detection of loads upon individual components of the landing gear that are subjected to overload conditions, thereby allowing service technicians to quickly identify only particular component(s) that require further inspection or replacement.

It is also appreciated that, in general, airline industry customers are hesitant to implement new detection systems unless required by the airframe manufacturer and/or aviation authorities. Further, additional detection systems typically correlate to increased costs, such as additional maintenance.

Therefore, there is a need for an inexpensive detection system that objectively and accurately assess the forces experienced by the landing gear and, further, the degree to which particular landing gear components approach design limits caused by the forces, e.g., an overload condition. Such a detection system can confirm or disprove pilot-made hard landing declarations, assure safe aircraft operation and, further, minimize maintenance costs associated therewith.

SUMMARY OF INVENTION

The present disclosure provides systems and methods for predicting loads experienced by a landing gear of an aircraft. The disclosed systems and methods provide sensors associated with the landing gear and, further, processing architecture for predicting the forces experienced by the landing gear.

The terms "strain gauge" or "strain sensors", as used herein, are not limited to traditional strain gauges that measure resistance changes from an increase or decrease in strain, but, instead, these terms refer to any device that can be used to determine strain or displacement of a component at a given location. The term "force" refers to a measure of the interaction between bodies, and the term "load" refers to the force exerted on a surface or body, e.g., the landing gear. The terms "comprises" or "comprising" are to be interpreted as specifying the presence of the stated features, integers, steps or components, but not precluding the presence of one or more other features, integers, steps or components or groups thereof. The term "landing gear", as used herein, is not limited to only an individual component of a traditional landing gear, but, instead, refers to a landing gear structure, including connecting components.

The present disclosure provides a system for predicting loading applied to a landing gear including, inter alia, a plurality sensors positioned proximate to the landing gear. The plurality of sensors measure strain experienced by the landing gear and each sensor yielding strain data. The system further includes a processor that receives the strain data from the plurality of sensors and predicts at least one ground load applied to the landing gear based on the strain data.

In some embodiments, at least one sensor of the plurality of sensors measures a hoop stress experienced by the landing gear structure and yields hoop stress data. The processor further receives the hoop stress data, and predicts the at least one ground load based on the hoop stress data and the strain data.

In other embodiments, the landing gear includes a bogie beam that has a pivot point and at least two axles. The plurality of sensors are positioned on either side of the pivot point, and the strain data includes measurements of loads from each of the at least two axles to yield individual axle data. The processor predicts the at least one ground load based on a summation of the individual axle data.

Alternatively, the landing gear can include a piston and a bogie beam that connects to the piston at a piston base. The bogie beam can include at least two axles and a pivot point. The plurality of sensors are positioned on either side of the pivot point and at least one of the plurality of sensors is positioned on the piston base.

The system can further include a power supply module, data acquisition circuitry, and a second processor. The power supply module provides power to the plurality of sensors, the data acquisition circuitry interrogates the plurality of sensors to acquire the strain data therefrom, and the second processor instructs the data acquisition circuitry as to the sampling rate and data resolution to be used to interrogate the plurality of sensors.

In some embodiments, the strain is measured at a sensor location and the processor further predicts an occurrence of an overload condition based on a model that relates a magnitude of the ground load to a design limit of the landing gear, e.g., a landing gear component, at the sensor location.

There is further disclosed a method for predicting a ground load applied to a landing gear. The method includes powering a plurality of sensors located proximate to the landing gear structure, interrogating the plurality of sensors via data acquisition circuitry to yield strain data instructing the data acquisition circuitry as to a sampling rate and data resolution to be used for the interrogating, and, finally, processing the strain data to predict a ground load applied to the landing gear.

These and other aspects of the systems and methods of the present disclosure will become more readily apparent to those having ordinary skill in the art from the following detailed description taken in conjunction with the drawings, described below.

BRIEF DESCRIPTION OF THE DRAWINGS

So that those having ordinary skill in the art can more readily understand how to employ the novel system and methods of the present disclosure, embodiments thereof are described in detail herein below with reference to the drawings, wherein.

In general, a component or a feature that is common to more than one drawing is indicated with the same reference number in each of the drawings.

DETAILED DESCRIPTION

Disclosed herein are detailed descriptions of specific embodiments of systems and methods for predicting the loads experienced by the landing gear which can be used to evaluate whether an overload condition has occurred.

The disclosed embodiments are merely examples of ways in which certain aspects of the disclosed systems and methods can be implemented and do not represent an exhaustive list of all of the ways the invention may be embodied. Indeed, it will be understood that the systems, devices, and methods described herein may be embodied in various and alternative forms. The figures, described above, are not necessarily to scale and some features may be exaggerated or minimized to show details of particular components. Well-known components, materials or methods are not necessarily described in great detail in order to avoid obscuring the present disclosure. Moreover, the figures illustrate some elements that are known and will be recognized by one skilled in the art. The detailed descriptions of such elements are not necessary to an understanding of the disclosure, and accordingly, are presented only to the degree necessary to facilitate an understanding of the novel features of the present disclosure.

To achieve the need for accurate detection of overload conditions, detection of the forces and loads applied to individual components of the landing gear, and, further, to provide simplified systems and methods that avoid unnecessary maintenance costs, the present disclosure provides systems and methods for accurate overload detection using a minimum number of sensors strategically placed proximate the landing gear.

The systems and methods provided by the present disclosure are illustrated conceptually in FIGS. 1-12. The systems and methods disclosed are not limited to use in the illustrated landing gear designs, but, instead, can be employed in a variety of landing gear constructions without departing from the inventive aspects of the present disclosure.

Figure 1:
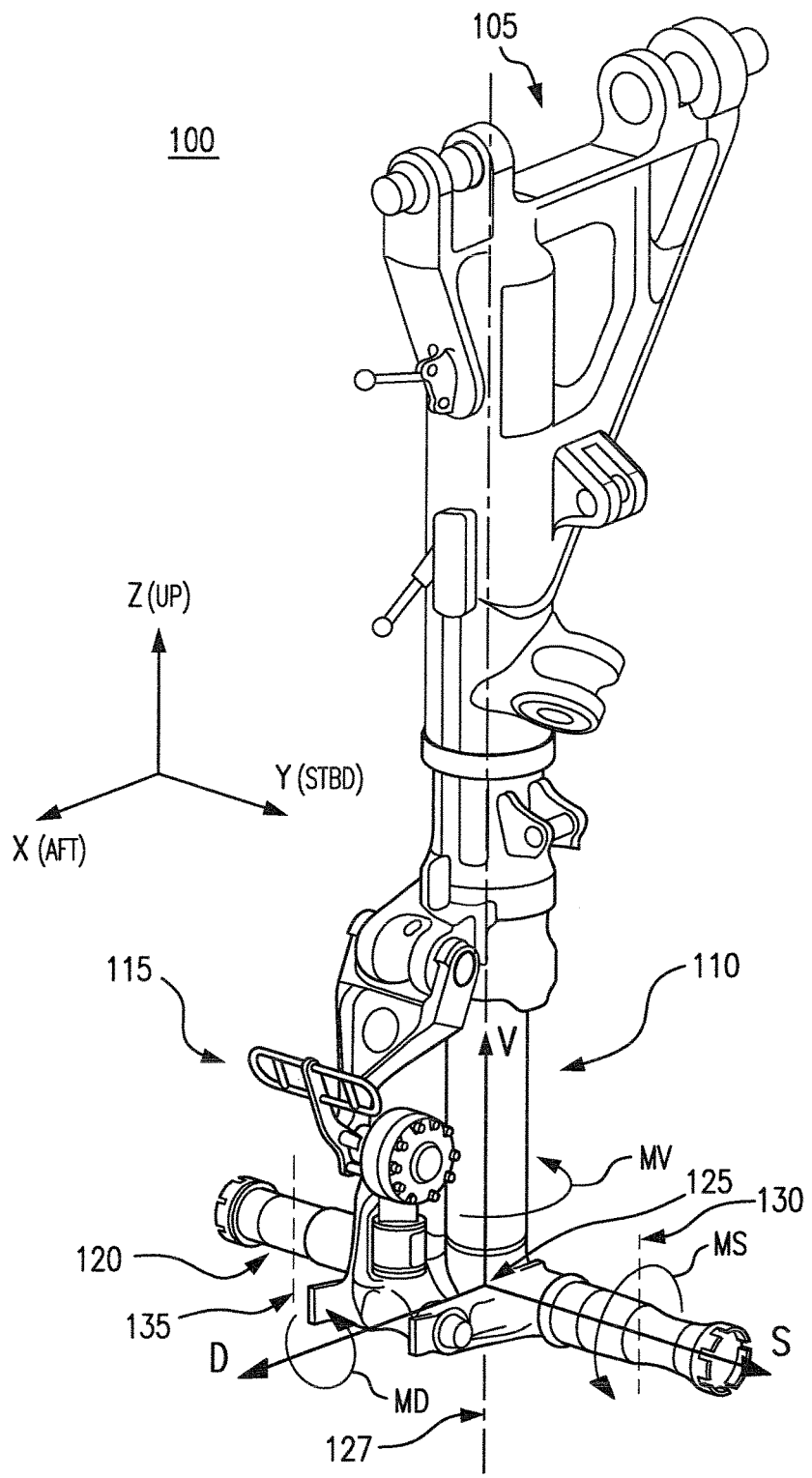
FIG. 1 is a perspective view of a typical landing gear structure.

FIG. 1 establishes an understanding of forces that are typically experienced by aircraft landing gears which can cause an overload condition. Sensors can be strategically placed on the landing gear to measure these loads. In particular, FIG. 1 is a perspective view of a typical landing gear, i.e., landing gear 100. Landing gear 100 includes a shock strut 105, a piston 110, a torque linkage 115, and an axle 120.

FIG. 1 illustrates loads and forces normally encountered by landing gear 100 along and about an X axis, a Y axis and a Z axis. The forces applied to landing gear 100 intersect at a landing gear post 125. Landing gear post 125 further serves as an intersection point between axle 120 and a shock strut centerline 127.

The loads applied to landing gear 100 along each of the X axis, the Y axis and the Z axis include a vertical force (V), a drag force (D), a side force (S), respectively. In addition, the loads further include moments about each of the X, Y and Z axis that include a vertical moment (MV), a drag moment (MD) and a side moment (MS), respectively. All of these forces and moments represent a total load applied at aircraft wheels (not shown) that are attached to axle 120. The aircraft wheels are not illustrated, but, instead, a vertical wheel centerline 130 and a vertical wheel centerline 135 represent placement of an inboard wheel and an outboard wheel, respectively, on axle 120.

The total loading, including applied forces and resultant moments, is calculated as follows:

$$\Sigma Fx = D = DA_i \text{ (or } DG_i) + DA_o \text{ (or } DG_o)$$

$$\Sigma Fy = S = S_i + S_o$$

$$\Sigma Fz = V = V_i + V_o$$

$$\Sigma Mx = MD = MD_i + MD_o + (V_i - V_o)Lw$$

$$\Sigma My = MS = -(DG_i + DG_o)RR$$

$$\Sigma Mz = MV = (D_o - D_i)Lw$$

Wherein:
D=DA (Drag force acting on axle centerline when brakes inactive)
D=DG (Drag force acting at the ground when brakes active)
RR=Tire Rolling Radius (i.e. distance from axle centerline to tire contact point)
Lw=distance from shock strut centreline to wheel centerline 130 (inboard wheel centerline 130 equals outboard wheel centerline 135).
Note: an assumption is made that landing gear 100 includes two wheels.

The loads that are applied to landing gear 100 are transferred from the aircraft wheels to piston 110 and torque linkage 115. The aircraft wheels experience ground loads when an aircraft is landing. Accordingly, sensors are strategically placed at piston 110 and torque linkage 115.

Figure 1A:
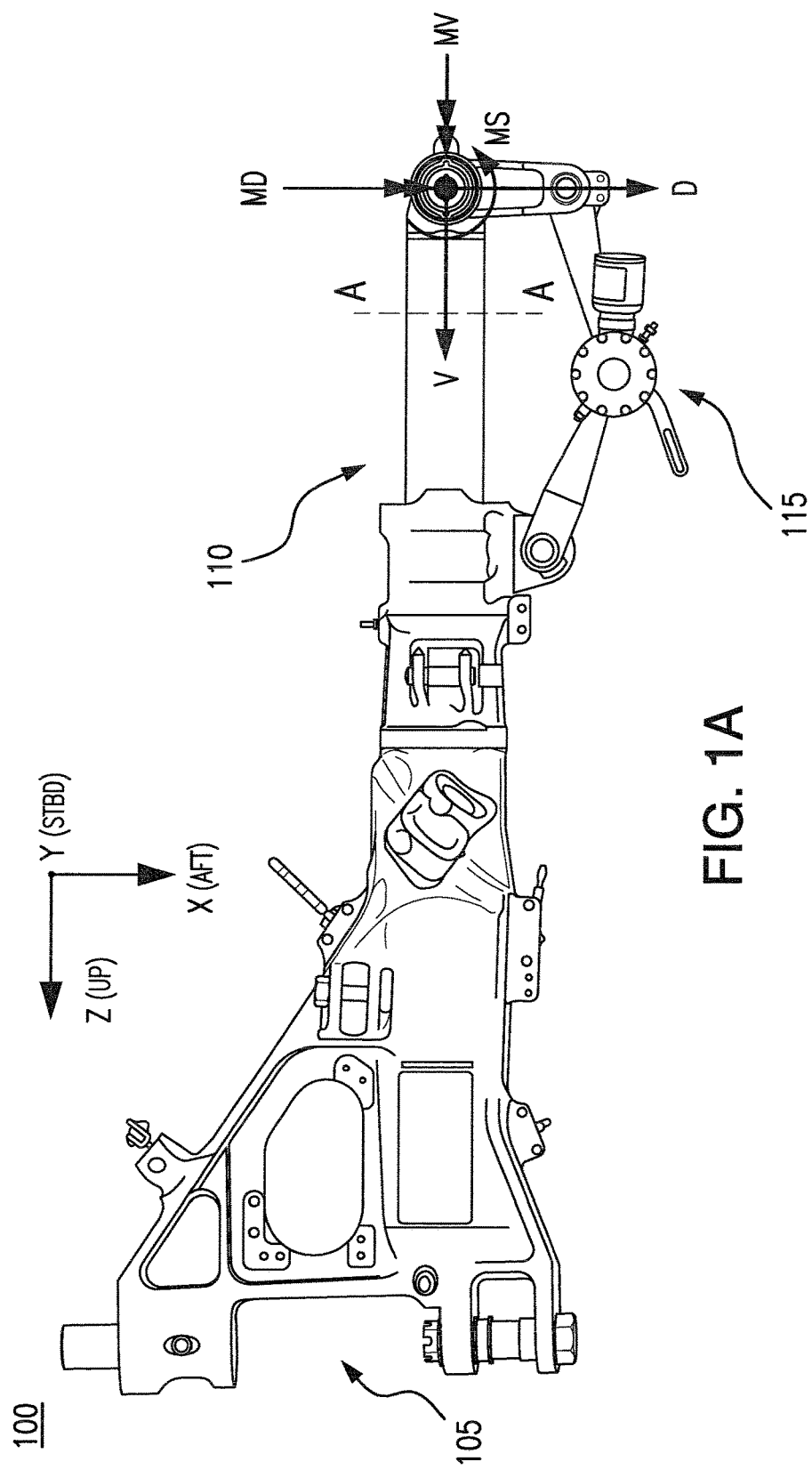
FIG. 1A is a side-elevation view of the landing gear structure of FIG. 1.

FIG. 1A is a side-angle view of FIG. 1, and highlights loads that specifically act upon piston 110. The total loading, including applied forces and resultant moments, upon piston 110 is calculated as follows:

$$\Sigma Fx = D$$

$$\Sigma Fy = S$$

$$\Sigma Fz = V$$

$$\Sigma Mx = MD + SL$$

$$\Sigma My = MS - DL$$

$$\Sigma Mz = 0$$

Wherein:
L is an axle trail, e.g., the distance from the axle centerline to the piston centerline.
S is a total side load
D is a total drag load
MV is reacted by the torque linkage.

Mz is zero at piston strain measurement locations since the torque linkage transfers MV to an upper landing gear structure. Further, some designs carry MV through the sensor location, however, most designs do not.

Figure 2:
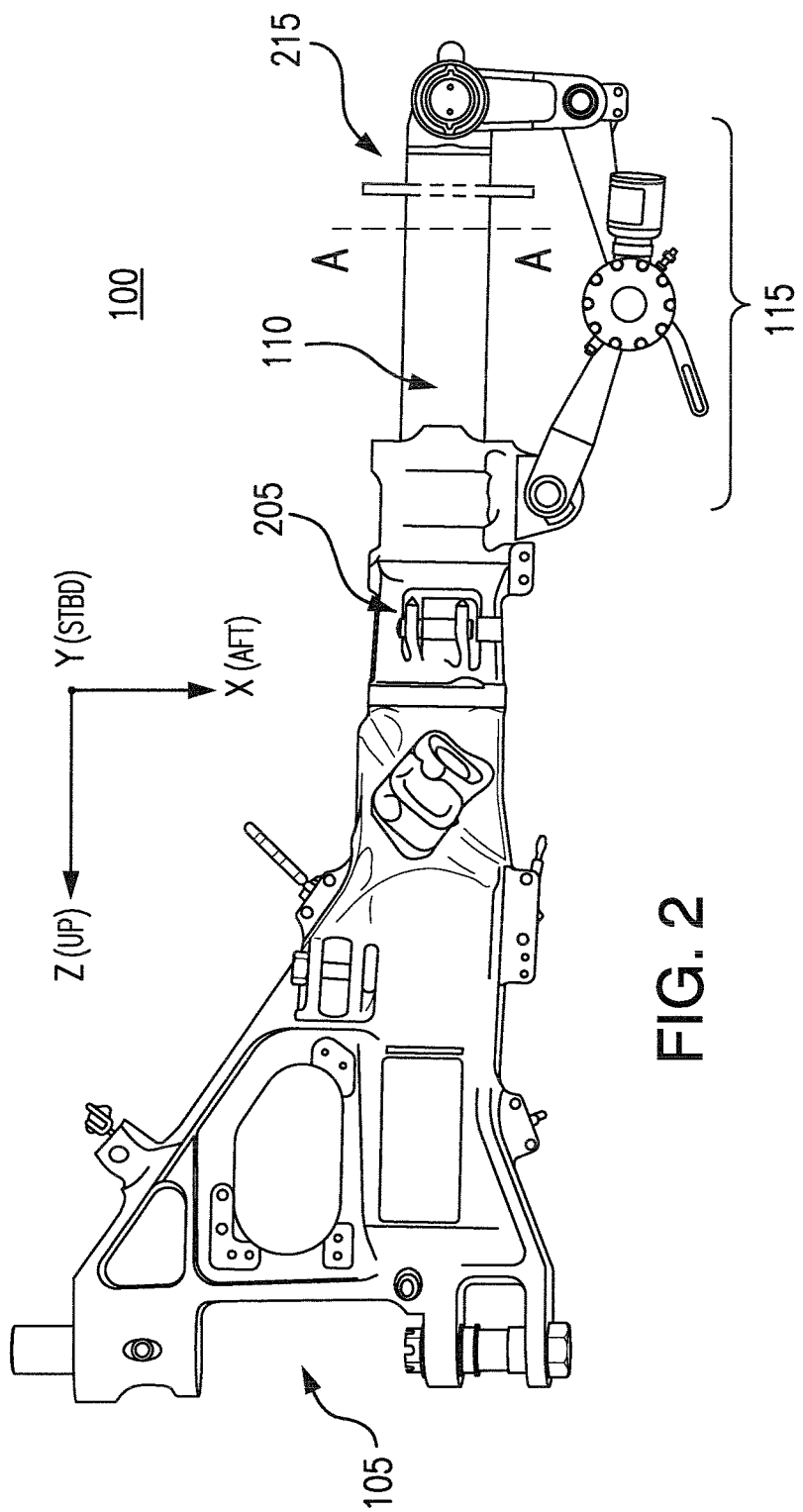
FIG. 2 is a side-elevation view of the landing gear structure of FIG. 1, which illustrates locations for placement of sensors.

FIG. 2 is a side-elevation view of the landing gear structure of FIG. 1 which illustrates locations for the placement of sensors.

In particular, FIG. 2 illustrates piston 110 and an outer cylinder 205, i.e., a piston barrel, and, further, illustrates placement of sensors 215 on piston 110. Piston 110 transfers the following loads to outer cylinder 205: Drag (D), Side (S), Vertical (V), Moment Drag (MD), and Moment Side (MS). (For nose landing gear (NLG) designs, there are no brakes, therefore MS=0). Accordingly, sensors 215 are placed on piston 110 to measure the loads applied to landing gear 100.

In some landing gear designs, however, oil in a shock strut is present throughout the entire length of the piston 110, and thereby causes hoop stress when compressed. According to Hooke's law, sensors 215 can be affected by this hoop stress since they are located on piston 110. Specifically, hoop stress affects uniaxial sensor measurements (uniaxial sensors are discussed with reference to FIGS. 3A-3C, below). As a result, an additional sensor or sensors is/are required to determine if any hoop stress is present at sensors 215. Once determined, sensors 215 can be calibrated, or sensor measurements can be later adjusted, to account for this.

Table 1 represents the loads that are applied of piston 110, and, thus, to landing gear 100. A black box indicates a shear based strain and a hashed box indicates a uniaxial based strain. Table 1 assumes that landing gear 100 has no rake angle, i.e., the vertical axis is parallel with the shock strut axis, and that the torque is reacted prior to the piston sensor location. Accordingly, Based on Hooke's law, the total axial strain can be calculated from the five load components in Table 1 which correspond to five unknown variables.

For example, the uniaxial stresses are as follows:

Bending $$\sigma_b = \frac{My}{Zxx} + \frac{Mz}{Zyy}$$

Axial $$\sigma_a = -\frac{V}{A}$$

Hoop $$\sigma_H = f(V)$$

Accordingly, the total stress values are:

$$\sigma_x = \sigma_b + \sigma_a = \left(\frac{MD+SL}{Zxx} + \frac{MS-DL}{Zyy}\right) - \frac{V}{A}$$

$$\sigma_y = \sigma_H = f(V)$$

Thus, the total axial strain equation, from Hooke's Law, is as follows:

$$\varepsilon_x = \frac{1}{E}(\sigma_x - \upsilon\sigma_y) = \frac{1}{E}\left[\left(\frac{MD+SL}{Zxx} + \frac{MS-DL}{Zyy} - \frac{V}{A}\right) - \upsilon\sigma_H\right]$$

According to the total axial strain equation above and represented in Table 1, there are a total of five unknown variables, i.e., five load components acting on piston 110. These five unknown variables, or five load components, generate axial strain at piston 110, via bending or direct axial loading. Accordingly, sensors 215 are designed to include five sensors that measure strain and predict the five load components, and, therefore solves for the five unknown variables.

Moreover, as discussed above, hoop stress may exist if the shock strut design allows for internal pressure, i.e., presence of oil, at the sensor locations. If hoop stress is present, an additional sensor is required to account for an x-component of strain caused by the hoop stress.

Figure 3A:
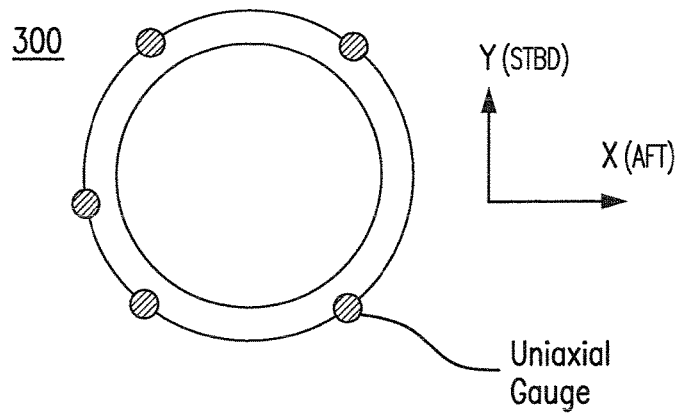
FIGS. 3A-3C are cross section views taken along section line A-A, which illustrate sensor arrangements.
Figure 3B:
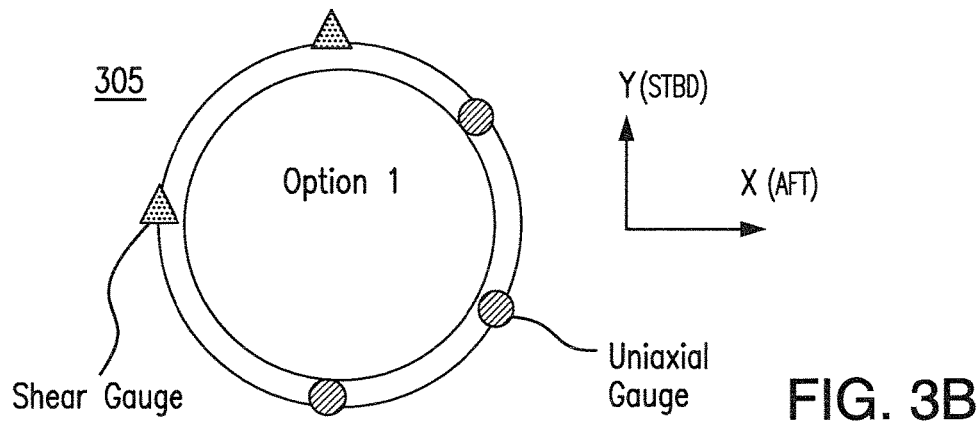
Figure 3C:
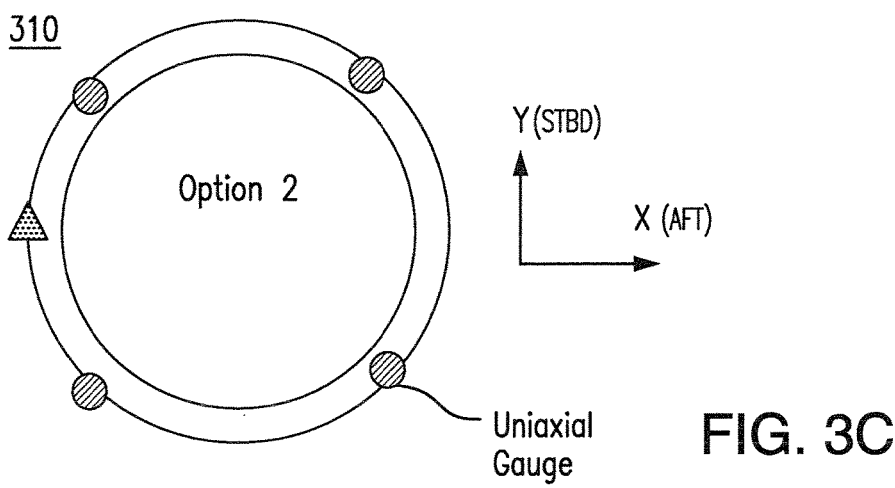

Sensors 215 are arranged in accordance with the five force components of Table 1 (and five unknown variables of the above-discussed equation), and include five sensors having arrangements illustrated in FIGS. 3A-3C.

FIGS. 3A-3C are cross section views taken along section line A-A, which illustrate three possible sensor arrangements. In particular, FIGS. 3A-3C provide arrangements 300, 305 and 310. Specifically, each of arrangements 300, 305 and 310 include five sensors to measure strain and predict the five load components acting on piston 110. FIG. 3A illustrates a sensor arrangement 300 including five uniaxial sensors or gauges, i.e., black dots. Sensor arrangement 300 only includes uniaxial sensors and, thus, requires highly accurate sensors. FIG. 3B illustrates a sensor arrangement 305 having three uniaxial sensors and two shear sensors, i.e., triangles. FIG. 3C illustrates a sensor arrangement 310 having four uniaxial sensor and one shear sensor.

Preferably, sensors 215 include an arrangement having at least one shear sensor in combination with uniaxial gauges, e.g., arrangements 305 and 310. This arrangement provides a robust design since both D and an MS produce bending about the Y axis, while S and MD produce bending about the X axis. Incorporating at least one shear sensor decouples the D and S from the MS and MD.

Sensor locations, e.g., orientation, quantity and type depend on an airframe program which the disclosed monitoring system is installed. Moreover, each landing gear design is traditionally static load tested prior to implementation. The static load testing can determine areas of maximum stress experienced by landing gear 100 and, further, determine optimized locations and types of sensors. For example, in each of arrangements of FIGS. 3A-3C, the five sensors are equally spaced; however, results of the static load testing may determine alternative spacing. In addition, if the sensors arrangement is implemented to only evaluate the weight and balance of the aircraft, shear sensors may prove unnecessary and, instead, arrangement 300, i.e., equally spaced and uniaxial sensors, is preferred. Ultimately, static load testing can be used to validate an effectiveness of a given arrangement and also computational features of the overload detection health and maintenance system (ODHMS) of the present invention.

The sensors are employed to measure loads applied to landing gear 100. The sensors are not limited to uniaxial or shear sensors, but, instead, refer to any device that can be used to determine strain or displacement of a component at a given location. Typically, the sensors are electronic and translate an applied load (including strain or displacement) into electronic data, e.g., stress or strain data. In addition, the sensors typically communicate with processing architecture. The processing architecture, including algorithms, includes a processor that receives sensor data, e.g., stress or strain data, and predicts at least one ground load based on the received sensor data. In some embodiments, the processor may be a stand-alone component or as an integrated arrangement of a plurality of sub-ordinate components. For example, the processor may be part of a control unit, data acquisition circuitry, or a combination thereof. Data acquisition circuitry typically receives sensor data in memory according to a sampling rate and a specified data resolution. In addition, the processor may be part of a data concentrator unit that receives and stores data from the data acquisition circuitry.

Further still, the processing architecture can predict an occurrence of the overload condition. For example, the processor predicts the occurrence of the overload condition based on a model that relates a magnitude of the ground load to a design limit of the landing gear at a sensor location. The model can be generated from data determined by finite element analysis or static load testing of the landing gear. In addition, after the processor predicts the occurrence of the overload condition, the processor further transmits an alarm, or causes an alarm to trigger. This alarm can include, but is not limited to an audio alarm or a visual alarm, e.g., a light.

In other embodiments, the processor communicates with a database that stores overload detection health and maintenance (ODHM) status. In particular, the database stores the strain data and the processor analyzes the strain data over time to yield a health status of the landing gear. For example, the processor can compare changes in the strain data over a time period to a baseline model that determines structural integrity of landing gear components, e.g., strain in a component v. time, to yield the health status.

Figure 4:
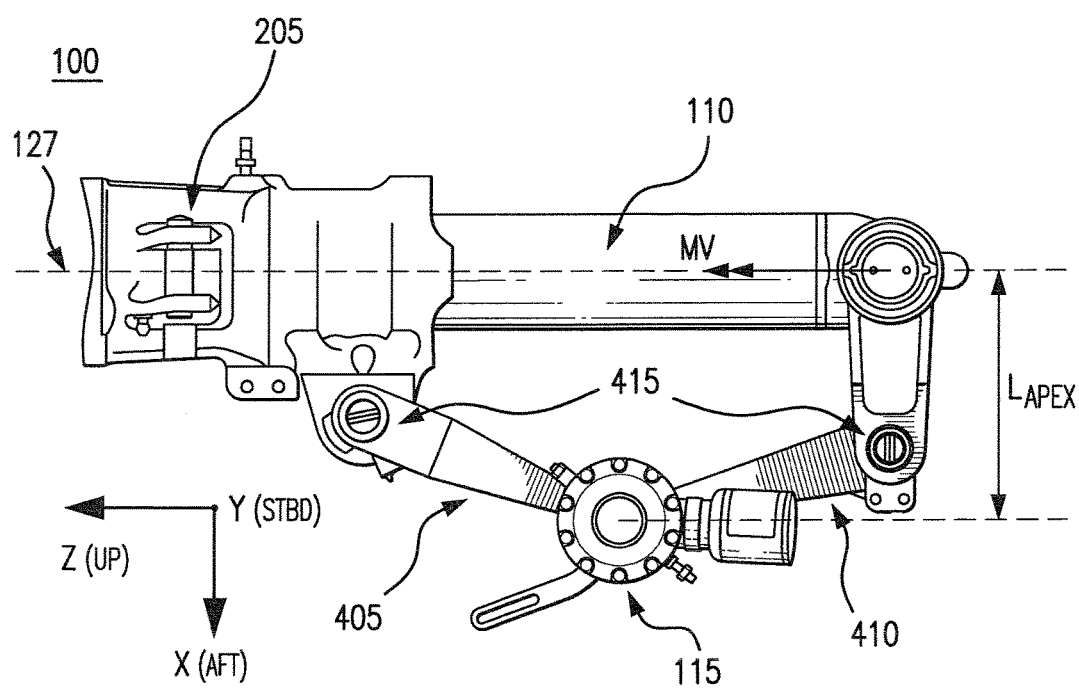
FIG. 4 is a side-elevation view of a lower portion of the landing gear structure of FIG. 1 and highlights a torque linkage.

FIG. 4 is a side-elevation view of a lower portion of the landing gear structure of FIG. 1 and highlights torque linkage 115. Torque linkage 115 includes an upper torque link 405, a lower torque link 410, and attachment pins 415. Torque linkage 115 transfers any moment acting about shock strut centerline 127, i.e., MV, to outer cylinder 205 (and, consequently, the airframe of the aircraft). Specifically, torque linkage 115 receives MV as a shear force that produces high bending loads.

FIG. 4 further illustrates $L_{APEX}$ that represents the distance from shock strut centerline 127 to an apex on torque linkage 115. $L_{APEX}$ represents a distance from shock strut centerline 127 to the apex of the torque linkage (which varies based on compression of the shock strut, e.g., varying vertical loads). $L_{APEX}$ is a factor in calculating MV which is discussed with reference to FIGS. 5A and 5B, below.

$L_{APEX}$ is determined by, and directly related to, a stroke of shock strut 105. Various techniques are used to determine the shock strut stoke and can include measuring a torque linkage angle change, which, in conjunction with a known geometry of the structure, provides the shock strut stroke.

Figure 5A:
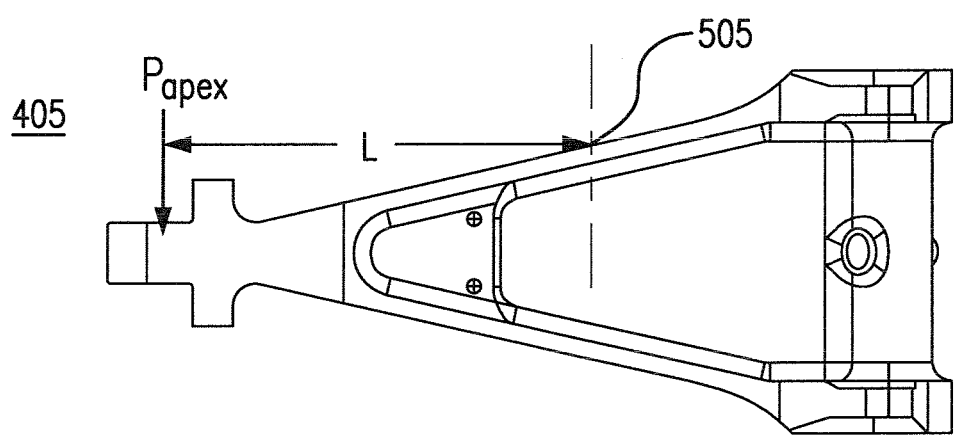
FIG. 5A is a top-elevation view of an upper torque link.
Figure 5B:
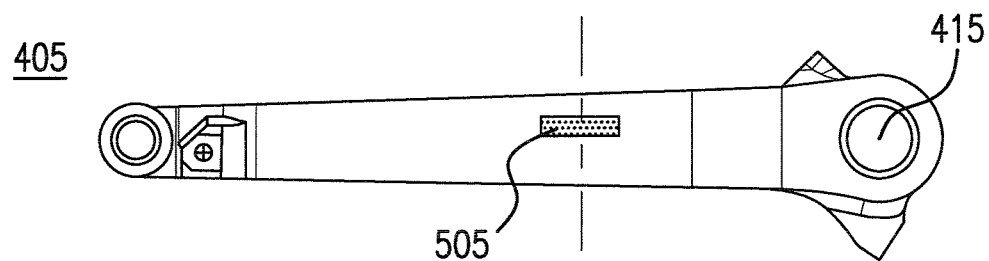
FIG. 5B is a side-elevation view of the upper torque link of FIG. 5A.

FIG. 5A is a top-elevation view of upper torque link 405, and FIG. 5B is a side-elevation view of upper torque link 405.

FIG. 5A includes a sensor 505 placed on a side of torque link 405 that is also illustrated in FIG. 5B. Sensor 505 is shown on upper torque link 405, but it is not limited to such. Instead, sensor 505 can be placed on lower torque link 410, on (or within) attachment pins 415, and on webbing of the torque linkage (not shown). Further, multiple sensors may be used and placed for any combination of these locations. Sensor 505 can include a uniaxial, shear, or specialized sensor, depending on location. For example, sensor 505 is a uniaxial sensor when located on upper torque link 405, a specialized sensor when located on or within attachment pins 415, and a shear sensor when located on the webbing of the torque linkage. For purposes of clarity, however, a single sensor, i.e., sensor 505, is illustrated on only upper torque link 405.

Placement of sensor 505 upon torque linkage 115 allows for a shear force, $P_{APEX}$, to be determined. Further, shear force $P_{APEX}$ is related to moment MV, via statics: $MV = P_{APEX} * L_{APEX}$ ($L_{APEX}$ is discussed with reference to FIG. 4, above). In addition, a length L represents a distance between $P_{APEX}$ and sensor 505. Length L is important to determining the MV. For example, basic equations relating MV to $P_{APEX}$ are as follows:

$$MBX = P_{apex}L \rightarrow P_{apex} = \frac{MBX}{L}$$

$$MV = P_{apex}L_{apex} \rightarrow MV = \frac{L_{apex}}{L}MBX$$

The bending stress and strain on upper torque link 405 (at the location of sensor 505) is as follows:

$$\sigma_x = \frac{MBX}{Zxx}$$

$$\varepsilon_x = \frac{\sigma_x}{E} \text{(assume that } \sigma_y \text{ components of stress is negligible)}$$

Combining the above-equations yields:

$$\varepsilon_x = \frac{MBX}{ZxxE} \rightarrow MBX = ZxxE\varepsilon_x$$

Therefore, the measured strain can now be related to the MV moment as follows:

$$MV = MBX\frac{L_{apex}}{L} = ZxxE\varepsilon_x\frac{L_{apex}}{L}$$

Note that generally speaking, NLG designs do not include brake installations. As a result, the MS moment is not measured since this moment is caused by braking events.

Combining the stress equations for piston 110 and torque linkage 115, discussed above, yields a general landing gear load algorithm as follows:

$$[A]\begin{Bmatrix} D \\ S \\ V \\ MD \\ MS \\ MV \end{Bmatrix} = \begin{Bmatrix} \varepsilon_1 \\ \varepsilon_2 \\ \varepsilon_3 \\ \varepsilon_4 \\ \varepsilon_5 \\ \varepsilon_6 \end{Bmatrix}$$

Further, if shock strut internal pressure influences the strain readings due to hoop stress the matrix becomes:

$$[A]\begin{Bmatrix} D \\ S \\ V \\ MD \\ MS \\ MV \\ Pressure \end{Bmatrix} = \begin{Bmatrix} \varepsilon_1 \\ \varepsilon_2 \\ \varepsilon_3 \\ \varepsilon_4 \\ \varepsilon_5 \\ \varepsilon_6 \\ \varepsilon_7 \end{Bmatrix}$$

Variables $\varepsilon_1$-$\varepsilon_5$ represent either uniaxial or shear strain measurements. As discussed above (with reference to FIGS. 3A-3C), sensors 215 includes at least one shear sensor, which decouples S from MD, and, ideally, is placed in a fore or aft direction. Furthermore, another shear sensor that measures strains placed in an inboard or outboard direction decouples MS and D. The A-Matrix, provided above, can be developed by a series of unit load calibration tests on a landing gear or development via finite element analysis (FEA). Once the A-Matrix is developed, simple linear algebra can be used to determine the values for D, S, V, MD, MS, MV and Pressure each time a load event is encountered. From these values, the impact of a loading event, e.g., a landing, on the overall landing gear 100 can be assessed. The algorithm can also be applied to measure wheel loads at axle 120 or axle loads on bogie beams (refer to FIGS. 8-10).

From the above-calculations, the following loads are applied to torque link 405 at the location of sensor 505:

$$MBX = P_{APEX}*L$$

$$PSY = P_{APEX}$$

Accordingly, MBX is directly proportional to $P_{APEX}$. This allows for sensor 505 to be calibrated to $P_{APEX}$. Calibration can initially be completed via FEA and subsequently verified during static testing. In addition, FEA can be used to determine optimal locations for sensor 505 (and any additional sensors). Further, if the initial sensor arrangement is based on an FEA model, an algorithm used in the ODHMS, disclosed herein, can later be calibrated with static load testing.

The above discussion emphasizes an application of multiple loads at and along specific locations of landing gear 100, and also provides strategic locations for placement of sensors, e.g., sensors 215 and sensor 505. The placement of sensors and measurement data therefrom can be analyzed using a finite element model (FEM), to yield a total load experienced by the landing gear structure. In addition, the application of multiple load components can further be generalized for other landing gear designs. For example, specific and strategic locations for placement of sensors, e.g. sensors 215, are provided for various landing gear structures illustrated in FIGS. 6-7.

Figure 6:
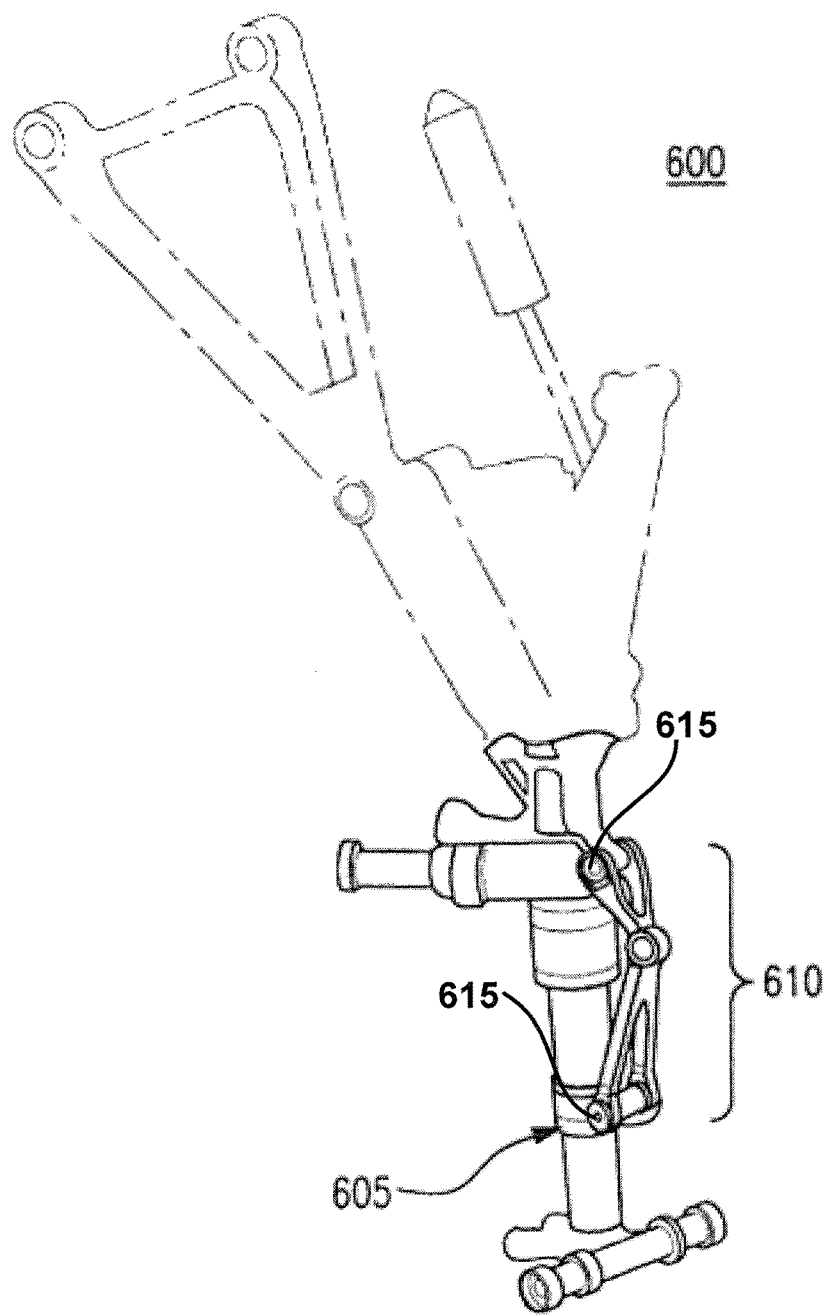
FIG. 6 provides a perspective view of a typical cantilever-type landing gear structure.

FIG. 6 provides a perspective view of a typical cantilever-type landing gear structure, i.e., landing gear 600. In particular, FIG. 6 highlights specific and strategic locations for placement of sensors on landing gear 600 that include a piston base 605, torque linkage 610 and/or attachment pins 615. Sensors placed at piston base 605 can be placed at an inboard side, an outboard side, or a combination thereof. In addition, these locations also apply for multi-axle landing gear designs.

Figure 7:
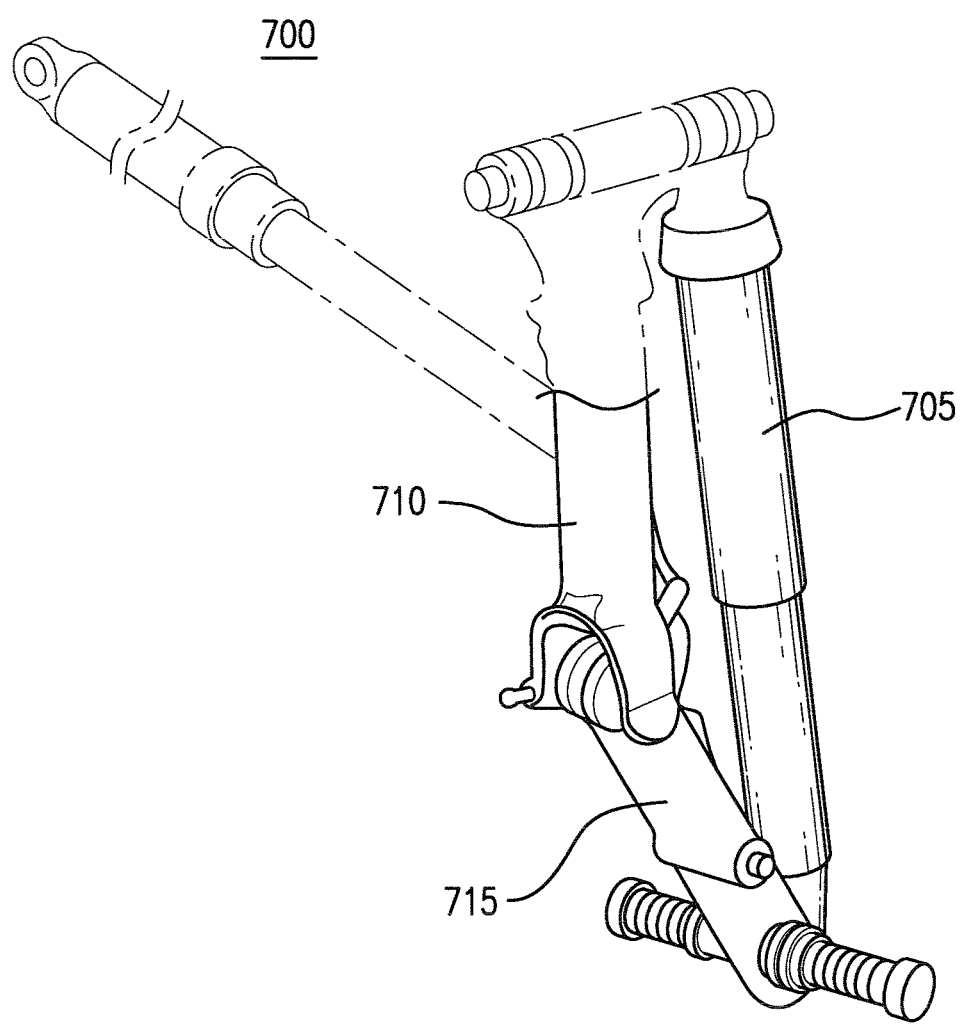
FIG. 7 provides a perspective view of a typical aft articulated-type landing gear structure.

FIG. 7 provides a perspective view of a typical aft articulated-type landing gear structure, i.e., landing gear 700. In particular, FIG. 7 highlights specific locations to place sensors on landing gear 700 that include a shock strut 705, a structural post 710 and a trailing arm 715. Placing a sensor on shock strut 705 can measure an axial load and also can correct for hoop stress due to internal pressure.

In addition to piston and torque linkage locations for two-wheel landing gear designs, additional sensors may be required to account for landing gear designs that support greater than two wheels, i.e., four wheel designs having a bogie beam.

Figure 8:
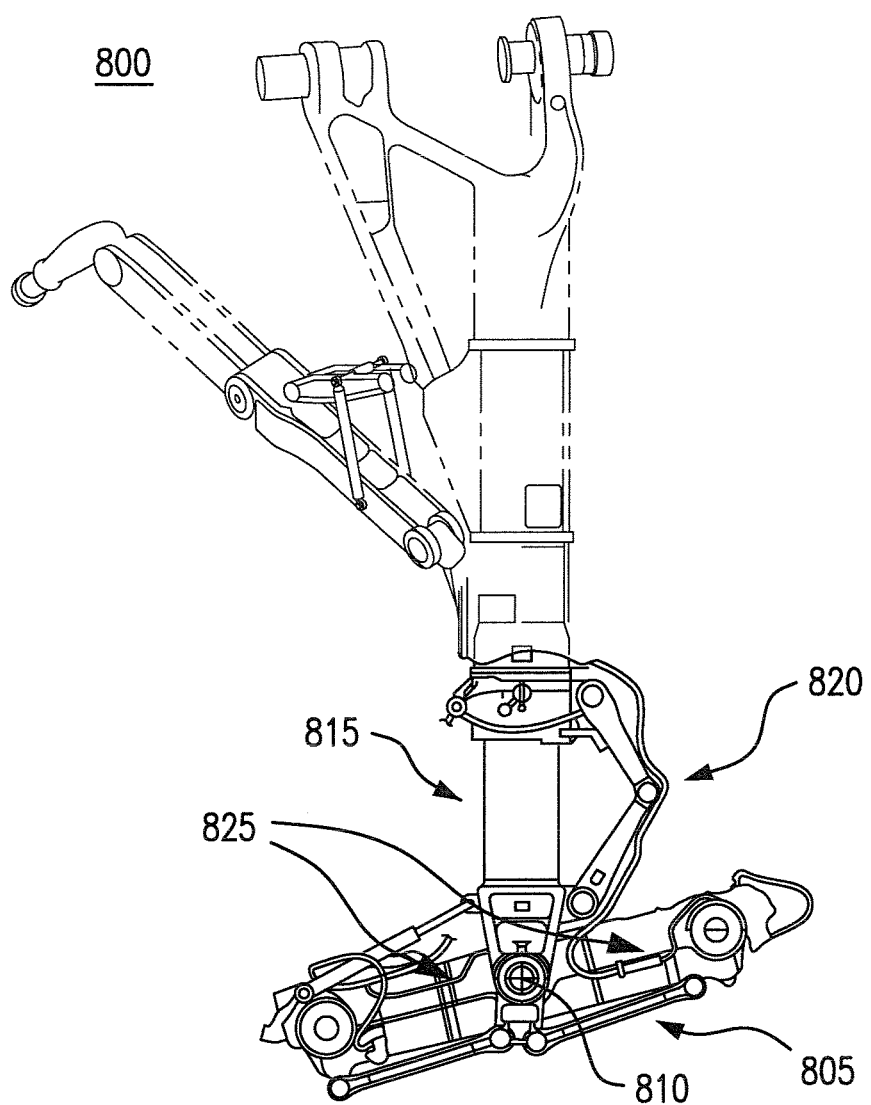
FIGS. 8-9 illustrate a typical cantilevered-type landing gear structure having greater than two wheels.
Figure 9:
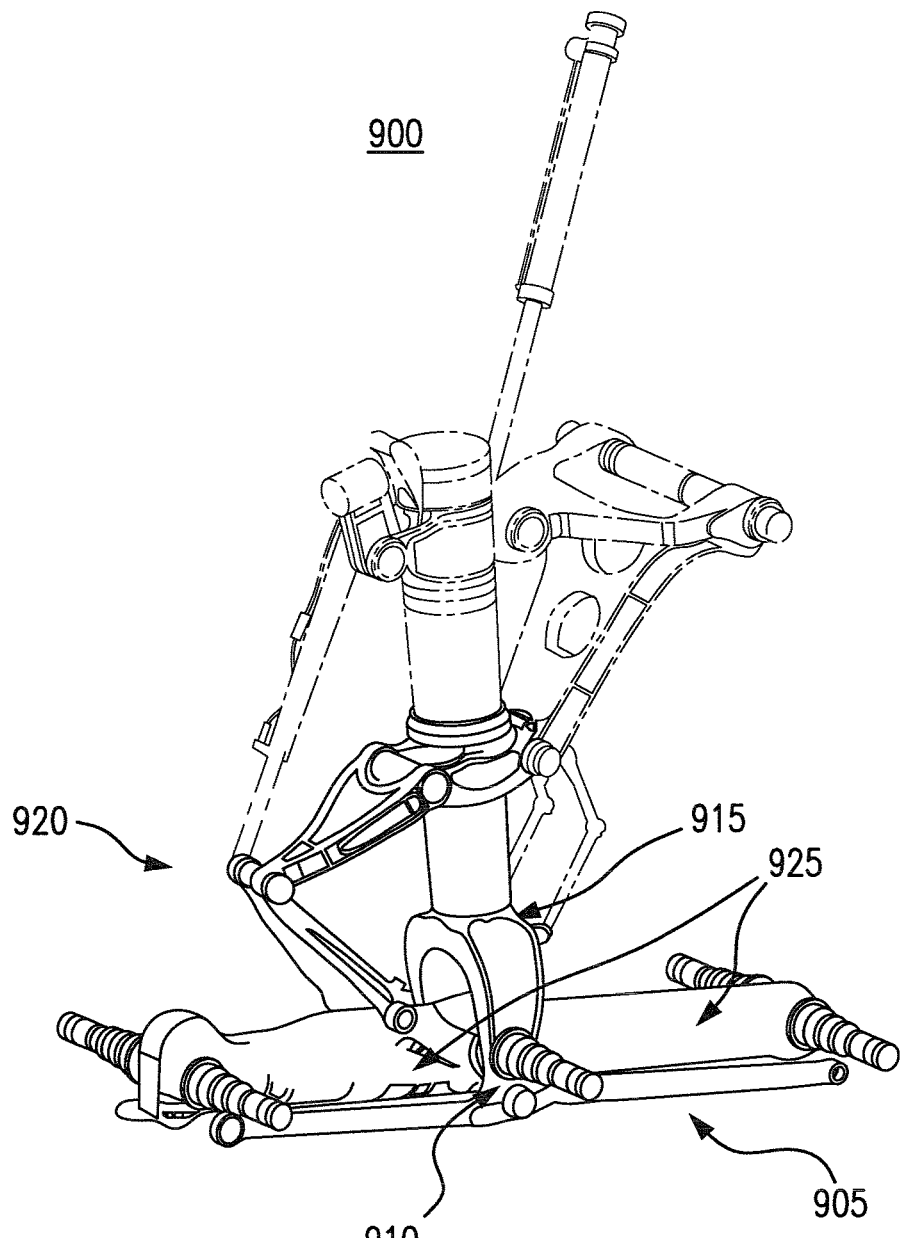

FIG. 8 and FIG. 9 illustrate a typical cantilevered-type landing gear structure having greater than two wheels.

In particular, FIG. 8 illustrates a cantilevered landing gear, i.e., landing gear 800. Landing gear 800 supports four wheels via a bogie beam 805. Landing gear 800 further includes a piston 815 and torque linkage 820. Bogie beam 805 pivots about landing gear 800 at pivot point 810.

Sensors such as those discussed above, e.g., uniaxial sensors and shear sensors, are strategically placed on either side of pivot point 810 on bogie beam 805, i.e., fore, aft, outbound and inbound. For example, sensors can be placed at sensor locations 825. The sensors can provide strain measurements in addition to, or, alternatively, instead of, sensors located on piston 815 and/or torque linkage 820. Sensors placed fore and aft of pivot point 810 (on bogie beam 805) measure individual axle loads. Typically, for the fore and aft measurement locations on the bogie beam, each location would need a minimum of six sensors. Therefore, a total of twelve sensors would be placed on the bogie beam itself. A summation of these loads determines the total load applied to landing gear 800.

FIG. 9 illustrates a cantilevered landing gear, i.e., landing gear 900 that supports six wheels, via a bogie beam 905. Landing gear 900 further includes a piston base 915 and torque linkage 920. Bogie beam 905 pivots about landing gear 900 at pivot point 910.

Similar to FIG. 8, sensors in FIG. 9 are strategically placed on either side of a pivot point 910 on a bogie beam 905, i.e., fore, aft, outbound and inbound. Further, sensors are placed at piston base 915. Specifically, sensors are placed at sensor locations 925 and also at piston base 915. These sensors provide strain measurements in addition to, or, alternatively, instead of, sensors located on the piston and/or torque linkage 920. Sensors placed fore and aft of pivot point 910 on bogie beam 905, and sensors placed at piston base 915 measure individual axle loads such as a forward axle, an aft axle and a center axle. Sensors are typically located on bogie beam 905 in the same fashion as those applied in FIG. 8—above, e.g., six sensors for each of fore and aft locations. However, the six wheel configuration further requires additional sensors placed on the piston and torque linkage similar to configurations discussed above for two wheel cantilever designs. A summation of all the sensor measurements determines the total load applied to landing gear 900.

In addition to the loads applied to the torque linkage, the piston, and the bogie beam, loads are also applied to the aircraft axle, e.g., axle 120, via aircraft wheels.

FIGS. 10A-10D highlight forces applied to an aircraft wheel, i.e., a wheel 1005, and, thus, to an axle, i.e., an axle 1010.

Figure 10A:
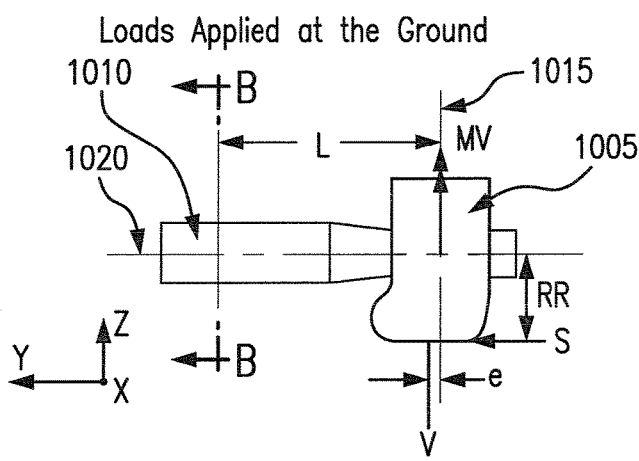
FIG. 10A is a front-elevation view of an axle having an aircraft wheel and loads applied thereto.

In particular, FIG. 10A is a front-elevation view of wheel 1005 attached to axle 1010. Axle 1010 includes a wheel centerline 1015 and an axle centerline 1020. FIG. 10A also illustrates a rolling radius (RR), a distance (e) between the vertical force (V) and wheel centerline 1015, a length (L) that measure a distance between wheel centerline 1015 to cross section line B-B (discussed below), a vertical moment (MV), and a side force (S).

Figure 10B:
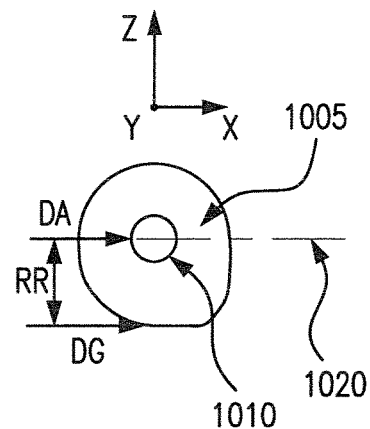
FIG. 10B is a side-elevation view of FIG. 10A.

FIG. 10B is a side-elevation view of FIG. 10A illustrating a drag force on axle 1010 (DA) and a drag force acting at the ground (DG), e.g., when brakes are active.

Figure 10C:
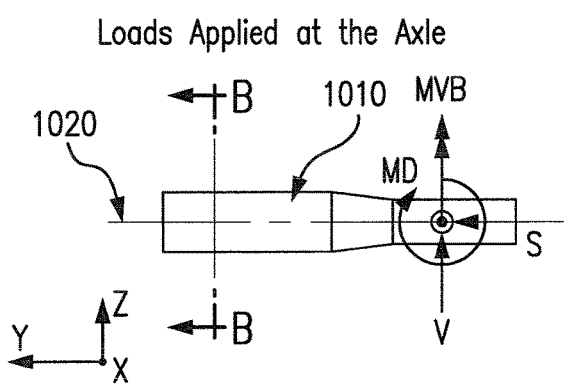
FIG. 10C is the same front-elevation view of FIG. 10A of an axle, but without the aircraft wheel.

FIG. 10C is the same front-elevation view of FIG. 10A of an axle 1010, but without the aircraft wheel 1005. FIG. 10C illustrates loads acting on axle 1010 that include MV, a drag moment (MD), V an S.

Figure 10D:
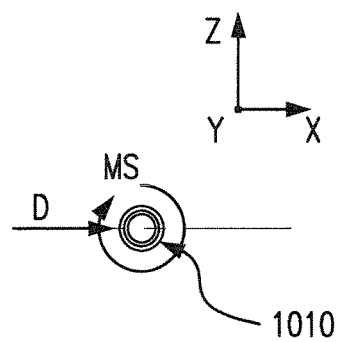
FIG. 10D is a side-elevation view of FIG. 10C.

FIG. 10D is a side view of FIG. 10C. FIG. 10D illustrates a drag force (D) and a side moment (MS) on axle 1010.

The total loads illustrated in FIGS. 10A-10D are calculated as follows:

$D=DA$ (Drag force acting on axle centerline when brakes inactive)

$D=DG$ (Drag force acting at the ground when brakes are active)

$S=$(Applied side load at the ground)

$V=$(Applied vertical load at the ground)

$MD=Ve+S\times RR$ (Applied moment about the global X-axis)

$MS=-DG\times RR$ (Applied moment about the global Y-axis (brake torque))

$MV\approx 0$ (Applied moment about the global Z-axis is typically assumed to be 0)

Figure 10E:
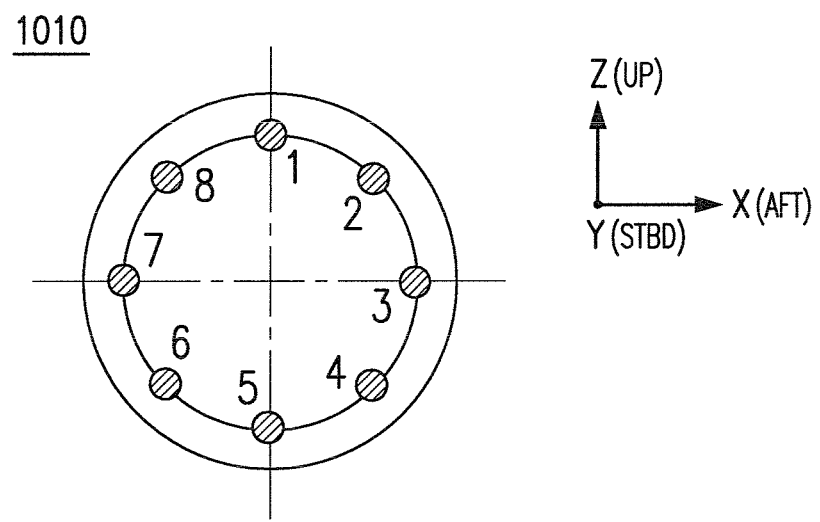
FIG. 10E is a cross-sectional view of axle 1010 shown in FIG. 10A viewed at cross section B-B.

FIG. 10E is a cross-sectional view of axle 1010 shown in FIG. 10A viewed at cross section B-B.

Axle 1010 is illustrated with eight uniaxial sensors numbered numerically 1-8. Eight sensors are chosen to measure loads at section B-B. However, preferably, only six sensors are required since there are six unknown variables needed to calculate the loads applied at section B-B. Specifically, the equation for equilibrium loading present at section B-B is as follows:

$\Sigma Fx=S$ $\Sigma Fy=D$ $\Sigma Fz=V$ $\Sigma Mx=0$ (any torque due to braking is not transferred to the axle)

$\Sigma My=MD-V(L-e)=Ve+S\times RR-V(L-e)=V(2e-L)+S\times RR$ $\Sigma Mz=MV+D(L-e)$ Accordingly, the six unknown variables include D, S, V, MV, RR and e. Six uniaxial strain sensors placed at various locations about axle 1010 provide measurements necessary to solve for these unknowns variables.

The six unknowns are developed from fundamental stress analysis equations which represent loads applied to axle 1010 at section B-B. More specifically, uniaxial sensors measure strain on bending forces, axial strain and hoop stress. Each type of these is calculated as follows:

Bending:

$$\sigma_b = \frac{My}{Zyy} + \frac{Mz}{Zzz}$$

Axial:

$$\sigma_a = -\frac{S}{A}$$

Hoop:

$\sigma_H$

Thus, the total loads applied to section B-B are determined as follows:

$$\sigma_x = \sigma_b + \sigma_a = \left(\frac{V(2e-L) + S \times RR}{Zyy} + \frac{MV + D(L-e)}{Zzz}\right) - \frac{S}{A}$$

$$\sigma_y = \sigma_H$$

The total axial strain is then (from Hooke's Law):
The total axial strain, determined from Hooke's Law is as follows:

$$\varepsilon_x = \frac{1}{E}(\sigma_x - \upsilon\sigma_y)$$
$$= \frac{1}{E}\left[\left(\frac{V(2e-L) + S \times RR}{Zyy} + \frac{MV + D(L-e)}{Zzz} - \frac{S}{A}\right) - \upsilon\sigma_H\right]$$

Although the hoop stress ($\sigma_H$) is also an unknown in the above-equation, the values of the expected hoop stress at each sensor can be deter wined by relating the applied loads to hoop stress via a finite element analysis (FEA). The FEA relates hoop stress to an applied load and is completed by applying combinations of vertical and drag ground loads to the model and applying combinations of MD and MV to the model. After FEA is conducted, and using the principle of superposition, the total axial strain can be related as follows:

$$\sigma_x = \sigma_x(D, V) + \sigma_x(MD, MV) + \sigma_x(S)$$
$$\sigma_y = \sigma_y(D, V) + \sigma_y(MD, MV)$$
$$\varepsilon_x = \frac{1}{E}(\sigma_x - \upsilon\sigma_y)$$
$$= \frac{1}{E}[(\sigma_x(S) + \sigma_x(D, V) + \sigma_x(MD, MV)) - \upsilon(\sigma_y(D, V) + \sigma_y(MD, MV))]$$

As discussed above, solving for total axial strain only requires knowledge of six unknown quantities, i.e., D, S, V, MV, RR and e. Therefore, six sensors solve for all of the unknown variables, and are placed about axle 1010 at section B-B.

In addition, the FEA obviates a need to derive stress equations based on applied loads and moments and, instead, FEA results, based on a finite element model (FEM), can be used directly. The FEA relates any hoop stress to an applied load via a two step process: (i) apply combinations of vertical and drag ground loads to the FEM and (ii) apply combinations of MD and MV moments to the FEM.

The location of loads and forces applied to an aircraft axle correlates to strategic placement of sensors about the aircraft axle. Further, these loads, forces, and strategic locations are generalized for various landing gear designs. For example, strategic locations for placement of sensors are provided for various landing gear designs in FIGS. 11-12.

Figures 11, 12:
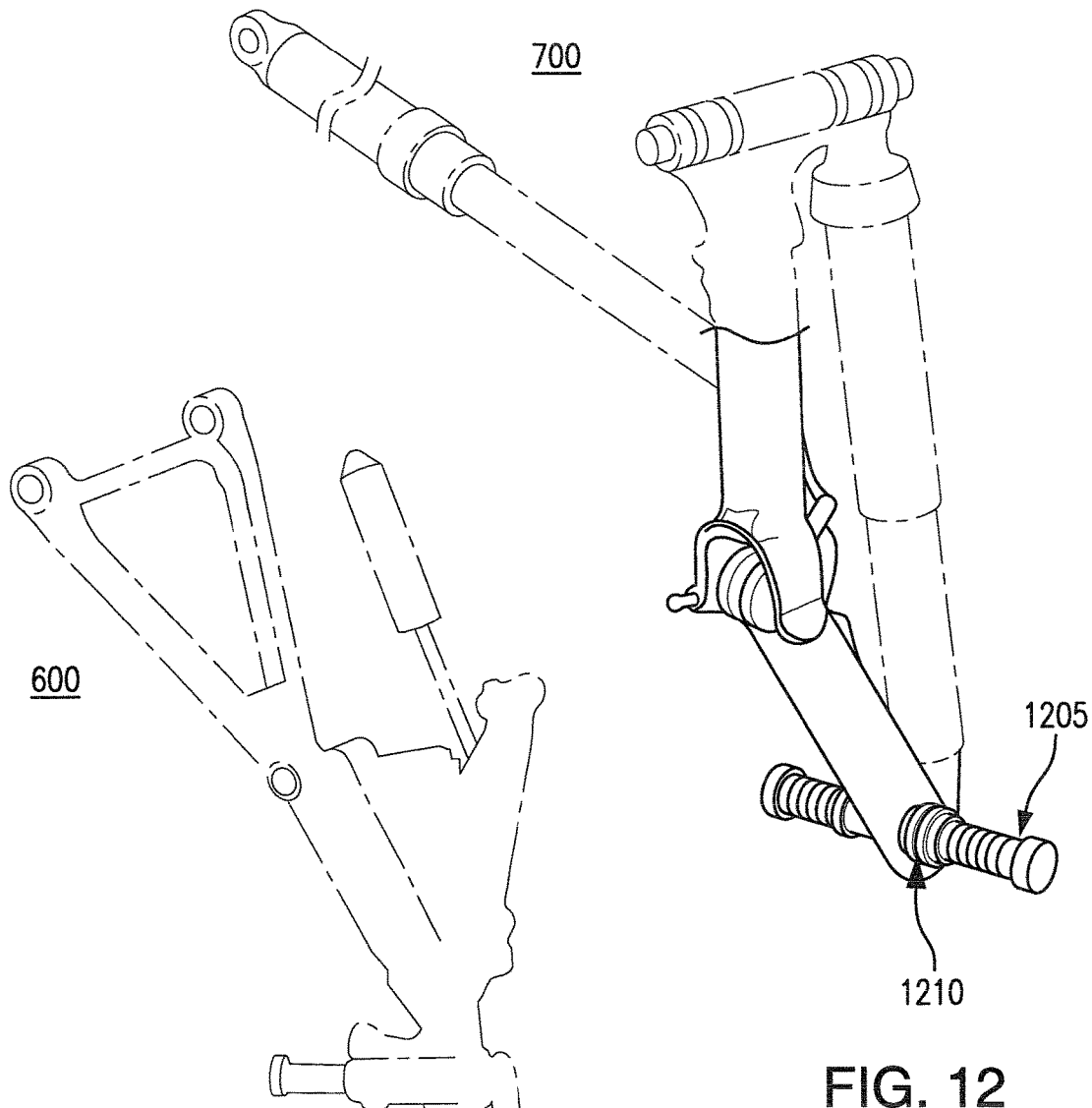
FIG. 11 illustrates the cantilever-type landing gear structure shown in FIG. 6 and locations for sensor placement on an axle thereof.
FIG. 12 illustrates the aft articulated-type landing gear structure shown in FIG. 7 and locations for sensor placement on an axle thereof.

FIG. 11 is a cantilever-type landing gear structure shown in FIG. 6, i.e., landing gear 600, and locations for sensor placement on an axle thereof.

Landing gear 600 includes an axle 1105 and a sensor location 1110. Sensor location 1110 indicates the location of uniaxial sensors. Sensor location 1110 is shown on an inboard section of axle 1105, but it is not limited to such. For example, sensor location 1110 can also be on an outboard section of axle 1105. Preferably, six sensors are located around a section of axle 1105 and, further, the six sensors are spaced equidistantly apart in an arrangement similar to sensor arrangement 300.

FIG. 12 illustrates the aft articulated-type landing gear structure shown in FIG. 7, i.e., landing gear 700, and locations for sensor placement on an axle thereof.

Landing gear 700 includes an axle 1205 and a sensor location 1210. Sensor location 1210 is typically where uniaxial sensors are located. Sensor location 1210, similar to sensor location discussed in FIG. 11—above, is shown on an inboard section of axle 1205, but it is not limited to such. For example, sensor location 1210 can also be on an outboard section of axle 1205. Preferably, six sensors are located around a section of axle 1205 and, further, the six sensors are spaced equidistantly apart in an arrangement similar to sensor arrangement 300.

In sum, the strategic locations for placement of sensors proximate to a landing gear include the piston, torque links (including attachment pins), the axle, or combinations thereof. In addition, for landing gears that employ bogie beams, sensors are strategically placed on either side, of a pivot point and also at the piston base. These designs provide a simple detection system (and methods directed thereto) that objectively and accurately assess the loads experienced by the landing gear and, further, the degree to which the landing gear components approach design limits caused by the loads.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

Although the system and methods of the present disclosure have been described with respect to the exemplary embodiments above, those skilled in the art will readily appreciate that changes and modifications may be made thereto without departing from the spirit and scope of this disclosure as defined by the appended claims.

What is claimed is:
1. A system for predicting loading of a landing gear comprising:
a plurality of sensors positioned proximate to the landing gear which yield strain data,
wherein the plurality of sensors comprises at least five sensors and the plurality of sensors measures at least five loads comprising a drag load, a side load, a vertical load, a moment drag load, and a moment side load, whereby the strain data may be determined; and
a first processor that receives the strain data from the plurality of sensors and predicts at least one ground load applied to the landing gear based on the strain data,
wherein the first processor further predicts a weight and a balance of an aircraft based only on the strain data;
a power supply module that provides power to the plurality of sensors;
data acquisition circuitry that interrogates the plurality of sensors to acquire the strain data therefrom; and
a second processor that instructs the data acquisition circuitry as to the sampling rate and data resolution comprising a bit resolution to be used to interrogate the plurality of sensors, wherein the second processor instructs the data acquisition circuitry to increase the sampling rate and the data acquisition resolution in response to a detected increasing strain.

2. The system of claim 1, wherein the landing gear comprises a piston and a torque linkage, wherein the plurality of sensors are positioned about each of the piston and the torque linkage.

3. The system of claim 1, wherein the landing gear comprises an axle, a piston, a torque linkage having an attachment pin, a trailing arm, and a shock strut, wherein the plurality of sensors are positioned about at least one of the axle, the piston, the torque linkage, the attachment pin, the trailing arm and the shock strut.

4. The system of claim 1, wherein the landing gear comprises an axle, a piston, a torque linkage having an attachment pin, a trailing arm, and a shock strut, wherein the plurality of sensors are positioned about each of the axle root, the piston, the torque linkage, the attachment pin, the trailing arm, and the shock strut.

5. The system of claim 1, wherein the plurality of sensors are selected from the group consisting of a uniaxial gauge and a shear gauge.

6. The system of claim 1, wherein at least one sensor of the plurality of sensors measures a hoop stress experienced by the landing gear and yields hoop stress data, wherein the processor further receives the hoop stress data, and predicts the at least one ground load based on the hoop stress data and the strain data.

7. The system of claim 1, wherein the landing gear further comprises a bogie beam having a pivot point and at least two axles, wherein the plurality of sensors are positioned on either side of the pivot point, wherein the strain data comprises measurements of loads from each of the at least two axles.

8. The system of claim 1, wherein the landing gear further comprises a piston and a bogie beam that connects to the piston at a piston base, the bogie beam comprising at least two axles and a pivot point, wherein the plurality of sensors are positioned on either side of the pivot point, and wherein at least one of the plurality of sensors is positioned on the piston base.

9. The system of claim 1, wherein the processor is a first processor, the system further comprising:
a control unit in communication with the plurality of sensors and positioned proximate the landing gear, the control unit including:
a power supply module for providing power to the plurality of sensors;
data acquisition circuitry that interrogates the plurality of sensors to acquire the strain data therefrom; and
a second processor that instructs the data acquisition circuitry as to the sampling rate and data resolution to be used to interrogate the plurality of sensors.

10. The system of claim 1, wherein the processor is a first processor, the system further comprising:
a power supply module that provides power to the plurality of sensors; data acquisition circuitry that interrogates the plurality of sensors to acquire the strain data therefrom; and
a second processor that instructs the data acquisition circuitry as to the sampling rate and data resolution to be used to interrogate the plurality of sensors.

11. A system as recited in claim 10, further comprising:
a data concentrator unit in communication with the second processor, the data concentrator unit processes and stores the strain data in non-volatile memory;
wherein the first processor receives the strain data from the data concentrator unit.

12. The system as recited in claim 10, wherein the first processor predicts the ground load applied to the landing gear based at least one algorithm.

13. The system of claim 10, wherein the first processor and the second processor are the same.

14. The system of claim 1, wherein the strain is measured at a sensor location, wherein the processor further predicts an occurrence of an overload condition in the landing gear, based on a model that relates a magnitude of the at least one ground load to a design limit of the landing gear.

15. The system of claim 14, wherein the model comprises data that is generated from at least one selected from the group consisting of finite element analysis and static load testing of the landing gear.

16. The system of claim 14, wherein the processor further transmits an alarm when the processor predicts the occurrence of the overload condition.

17. The system of claim 1, further comprising a database in communication with the processor, wherein the database stores the strain data, wherein the processor further compares changes in the strain data over a time period yield a health status of the landing gear.

18. A system for predicting loading of a landing gear comprising:
a plurality of sensors positioned proximate to the landing gear which yield strain data,
wherein the plurality of sensors comprises at least five sensors and the plurality of sensors measures at least five loads comprising a drag load, a side load, a vertical load, a moment drag load, and a moment side load, whereby the strain data may be determined; and
a first processor that receives the strain data from the plurality of sensors and predicts at least one ground load applied to the landing gear based on the strain data;
a control unit in communication with the plurality of sensors and positioned proximate the landing gear, the control unit including:
a power supply module for providing power to the plurality of sensors;
data acquisition circuitry that interrogates the plurality of sensors to acquire the strain data therefrom; and
a second processor that instructs the data acquisition circuitry as to the sampling rate and data resolution comprising a bit resolution to be used to interrogate the plurality of sensors,
wherein the second processor instructs the data acquisition circuitry to increase the sampling rate and the data acquisition resolution in response to a detected increasing strain.

* * * * *